United States Patent [19]

Sigg

[11] Patent Number: 4,637,169
[45] Date of Patent: Jan. 20, 1987

[54] APPARATUS FOR CONTROLLING THE ADVANCE OF A MACHINE TOOL TOWARD A WORKPIECE

[75] Inventor: Hans Sigg, Neuchatel, Switzerland

[73] Assignee: Meseltron SA, Corcelles, Switzerland

[21] Appl. No.: 766,373

[22] Filed: Aug. 16, 1985

[30] Foreign Application Priority Data

Aug. 27, 1984 [FR] France ............... 84 13326

[51] Int. Cl.$^4$ .................................. B24B 49/10
[52] U.S. Cl. .................. 51/165.77; 51/165.92; 82/DIG. 9; 364/474; 408/10; 409/196
[58] Field of Search .............. 82/DIG. 9; 51/165 R, 51/165.77, 165.92; 364/474; 409/196; 408/10

[56] References Cited

U.S. PATENT DOCUMENTS

| | | | |
|---|---|---|---|
| 2,866,301 | 12/1958 | Koulicouitch | 51/165 R |
| 3,897,659 | 8/1975 | Henry | 51/165.92 |
| 3,952,458 | 4/1976 | Tomita | 51/165.77 |
| 4,012,870 | 3/1977 | Berniere | 51/165 R |
| 4,139,969 | 2/1979 | Brown | 51/165.77 |
| 4,428,055 | 1/1984 | Kelley | 364/474 |

FOREIGN PATENT DOCUMENTS

| | | |
|---|---|---|
| 0072687 | 2/1983 | European Pat. Off. |
| 1237876 | 6/1959 | France |
| 2306791 | 11/1976 | France |
| 2382310 | 11/1978 | France ............... 51/165.77 |
| 569442 | 8/1977 | U.S.S.R. ............... 51/165.92 |

Primary Examiner—Harold D. Whitehead
Attorney, Agent, or Firm—Sughrue, Mion, Zinn, Macpeak and Seas

[57] ABSTRACT

The advance of a tool toward a workpiece is controlled with two acoustic transducers, one acting as a transmitter and the other as a receiver. The acoustic energy transmitted from the one to the other as the tool and the workpiece approach one another (this continuing until contact between the two elements) is detected and used to control a reduction in the speed of approach. The acoustic energy may be transmitted at a predetermined frequency, modulated or characterized in another manner.

7 Claims, 3 Drawing Figures

APPARATUS FOR CONTROLLING THE ADVANCE OF A MACHINE TOOL TOWARD A WORKPIECE

This invention concerns machine tools in which a tool and a workpiece move relative to one another in the course of the various work phases. In particular, the invention concerns a method and an arrangement for controlling the advance of the tool towards the workpiece.

As a general rule, the approach of a tool towards the workpiece in machine tools is brought about at a relatively high speed in order to reduce to the greatest possible extent the dead time of the machine. However, when the tool comes into contact with the workpiece, it is desirable to reduce very rapidly such high approach speed in order to avoid deterioration as much in the tool itself as in the workpiece.

BACKGROUND OF THE INVENTION

It has long been known to employ arrangements, in particular in grinding or truing machines, which comprise an acoustic transducer, preferably of the piezo-electric type intended to detect the acoustic emission which is generated when the grinder touches the workpiece, the signal thus obtained being amplified and thereafter employed to reduce, if necessary to zero, the relatively high speed employed during the approach phase. Such arrangements are described particularly in Swiss patent Nos. 316.871, 585.609 and French patent Nos. 1.371.394 and 1,562.799.

At the same time these known arrangements present a disadvantage in that the sound generated by the tool when it comes into contact with the workpiece, is scarcely differentiated in intensity and frequency from the parasitic noises produced by the machine, for example the noise of bearings, gears, pneumatic or hydraulic drive means, etc. to the extent that satisfactory operation of the arrangement may not always be guaranteed.

The purpose of the invention is to provide a method and an arrangement for controlling the advance of a tool in a machine tool which avoid the previously mentioned difficulties.

SUMMARY OF THE INVENTION

The invention thus has initially as objective to provide a method which consists in detecting during the course of the approach phase of the tool towards the workpiece an acoustic signal representative of the advance of the tool towards the workpiece when at a distance below a predetermined distance and to reduce, if necessary to zero, the approach speed of the tool at the appearance of the said representative signal, this method being characterized in that it consists likewise in subjecting a first of the elements constituted by the workpiece and the tool to an acoustic excitation and in that the detected acoustic signal is that which appears in the second of said elements as a result of the acoustic energy transmitted from the first element to the second element.

Being given that in the method according to the invention there is employed a purposely generated acoustic signal transmitted from one element to the other, the detection of the approach of the tool towards the workpiece at less than a predetermined distance depends neither on the intensity nor the frequency of the sound generated by the working of the machine. Thus the method is applicable not only to grinding or truing machines, but likewise to other machine tools such as sawing machines, milling machines, boring machines, latches, etc. in which the second generated by the removal of material is only weakly distinguishable from parasitic noises.

In certain machine tools there is employed a cooling liquid which sprays the space between the tool and the workpiece, even during the approach phase. In this case the invention brings a considerable advantage from the fact that the acoustic signal may be sufficiently powerful to be detected before the tool comes into contact with the workpiece since acoustic energy may already be transmitted through the medium of the liquid film which is established between the workpiece and the tool. Thus thanks to such early detection one may employ still higher approach speeds. It is evident moreover that an early detection of the approach of the tool towards the workpiece when below a certain distance may further be particularly useful in avoiding or reducing the deterioration which can occur through collision of the workpiece and tool, for instance when the pieces are poorly mounted.

The invention likewise has as objective a control arrangement permitting the putting into practice of the method according to the invention.

DESCRIPTION OF THE PREFERRED EMBODIMENT

Figure 1:
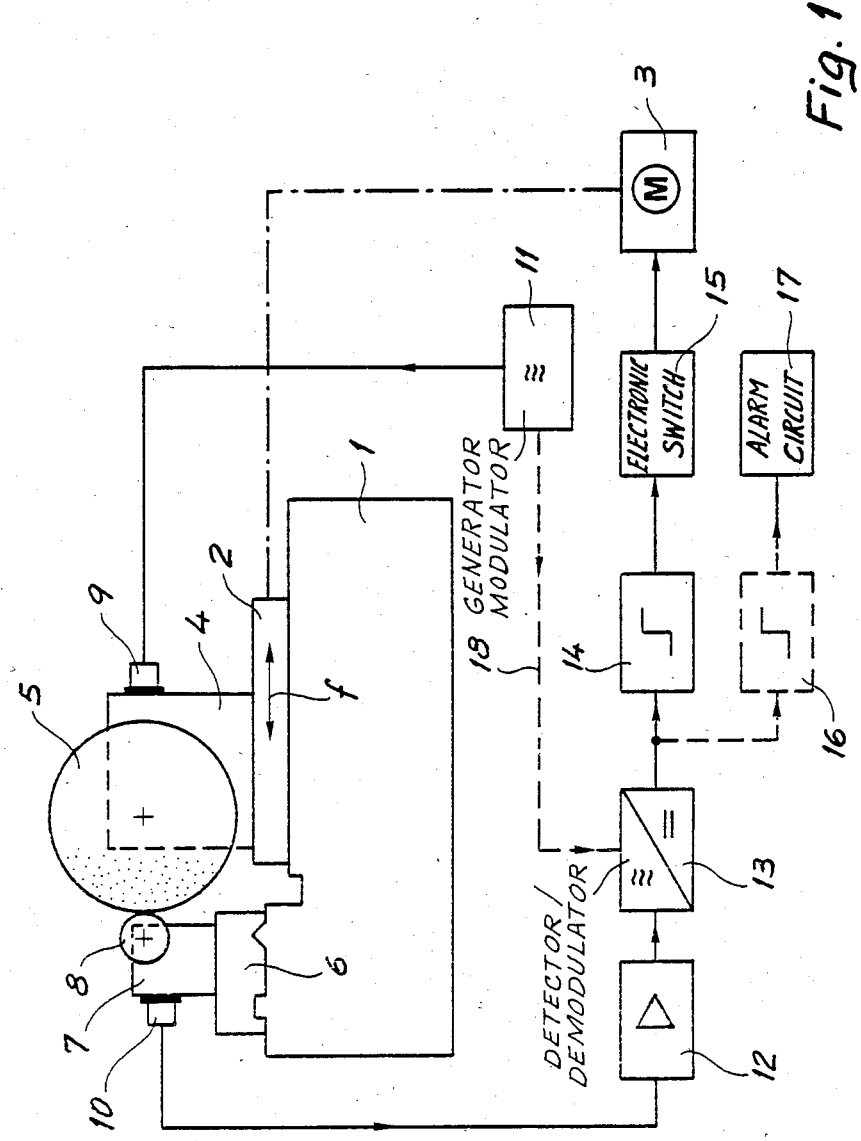
FIG. 1 shows a greatly simplified schematic of a grinding/truing machine in which the method according to the invention is put into practice.

There is shown on FIG. 1 the support frame 1 of a grinding/truing machine. This framework supports a first carriage 2 displaceable in translation along the framework according to arrow f, through means of a drive motor 3. Carriage 2 includes a tool support 4 on which is mounted a grinder 5 in rotation about a horizontal axis.

The support frame 1 likewise supports a second carriage 6 displaceable in translation according to a direction perpendicular to direction f and this carriage includes a support 7 for a workpiece 8. Supports 4 and 7 are provided with transducers 9 and 10, one of which is a transmitter and the other a receiver. These may be vibration transducers capable of applying to the associated support or detecting in such support acoustic energy in the form of vibrations. The piezo-electric transducers manufactured by ENDEVCO, 6901 Heidelberg—Eppelheim, Federal Republic of Germany, under number 213E are suitable.

Transducer 9, which here is the emitting transducer, is connected to an electronic generator 11 which furnishes thereto the necessary electrical energy for its operation. Transducer 10 which is employed as a receiver is connected to an amplifier 12 the output of which is coupled to a detector circuit 13 controlling a first electronic switch 14, this latter being connected to a control circuit 15 which assures the control of motor 3 and in particular enables reducing the speed of such motor.

In accordance with a particular characteristic of the invention, the output of the detector circuit 13 may be connected to a second electronic switch 16 which is coupled to an alarm circuit 17 enabling the generation of a warning signal or stopping the operation of the machine when the electronic switch 16 is activated. Finally, the electronic generator 11 is coupled to the detector circuit 13 via a connection 18 over which may be transmitted a reference signal intended for such detector.

The operation of the control arrangement which has just been described is as follows:

Electronic generator 11 energizes transducer 9 fixed to support 4 of the grinder 5. The acoustic vibrations emitted by transducer 9 are transmitted via support 4 to the grinder 5 and from there to the workpiece 8 when there is contact between the grinder and the workpiece or where there is another transmission medium present between these two elements (such as for example sprayed cooling liquid). The energy thus transmitted to workpiece 8 is detected by transducer 10 which generates an electric signal applied to amplifier 12 which, following amplification thereof transmits this signal to the detector circuit 13.

The signal furnished by the electronic generator 11 may be of various types.

Thus, such signal may consist of a regularly alternating voltage of a predetermined frequency. In this case the detector circuit 13 may be formed from a simple rectifier and when the DC output voltage from this rectifier exceeds a predetermined level, the electronic switch 14 is actuated in order that via control circuit 15 the rotation speed of motor 3 is reduced or the motor is stopped. In this case it is advantageous that the transducer 10 as well as amplifier 12 be tuned to the frequency of generator 11 for example by providing a resonant circuit in the transducer 10 and/or employing band-pass filters in amplifier 12.

Moreover, the signal produced by the electronic generator 11 may be modulated in various manners, for instance in amplitude, in frequency, in phase or by pulse code or again by a combination of these several modes of modulation. In these cases, the detector circuit 13 must be adapted in consequence thereof so as to be capable of demodulating the signal according to the method of modulation employed in generator 11.

It is to be noted that the transmission of acoustic energy occurs not only between transducers 9 and 10 via the tool 5 and the workpiece 8, but also in a parasitic manner via supports 4 and 7 and from the support 50 framework 1. Such a shunt path implies a greater distance for the acoustic energy than that corresponding to the direct path in a manner such that this energy has a longer propagation time and may thus be distinguished from the useful signal. To bring about such discrimination means may be provided in the electronic generator 11 for the generation of a pulsed signal and in the detector circuit 13 for discriminating between the propagation time of the pulses transmitted on the one hand directly between transducers 9 and 10, and on the other hand indirectly between these transducers via the framework 1 of the machine. A preferred realization putting into practice such discrimination is hereinafter described in respect of FIGS. 2 and 3.

It is also possible to arrange the detector circuit 13 as a phase discriminator permitting the detection of out-of-phase conditions between the direct signal and the parasitic signal.

It is thus possible to remove from the output signal of the detector circuit 13 all components which do not correspond to the acoustic energy transmitted directly between transducers 9 and 10. However, according to a particular characteristic of the invention, it is possible to employ the signal corresponding to this parasitic component for supervising the proper operation of the system. Effectively, the detector circuit 13 may be equipped with an amplitude discriminator providing a control signal to the switch 16 when the amplitude exceeds a predetermined value or more particularly drops below this value. Thus it is possible to control the warning circuit 17. Such diminution of amplitude indicates poor functioning of one of the elements of the chain constituted by the electronic generator 11, the transmission elements constituted by the machine tool, the amplifier 12 and detection circuit 13. In other words, the warning signal might warn the operator to stop the machine for checking and/or effect an automatic stopping thereof.

Figure 2:
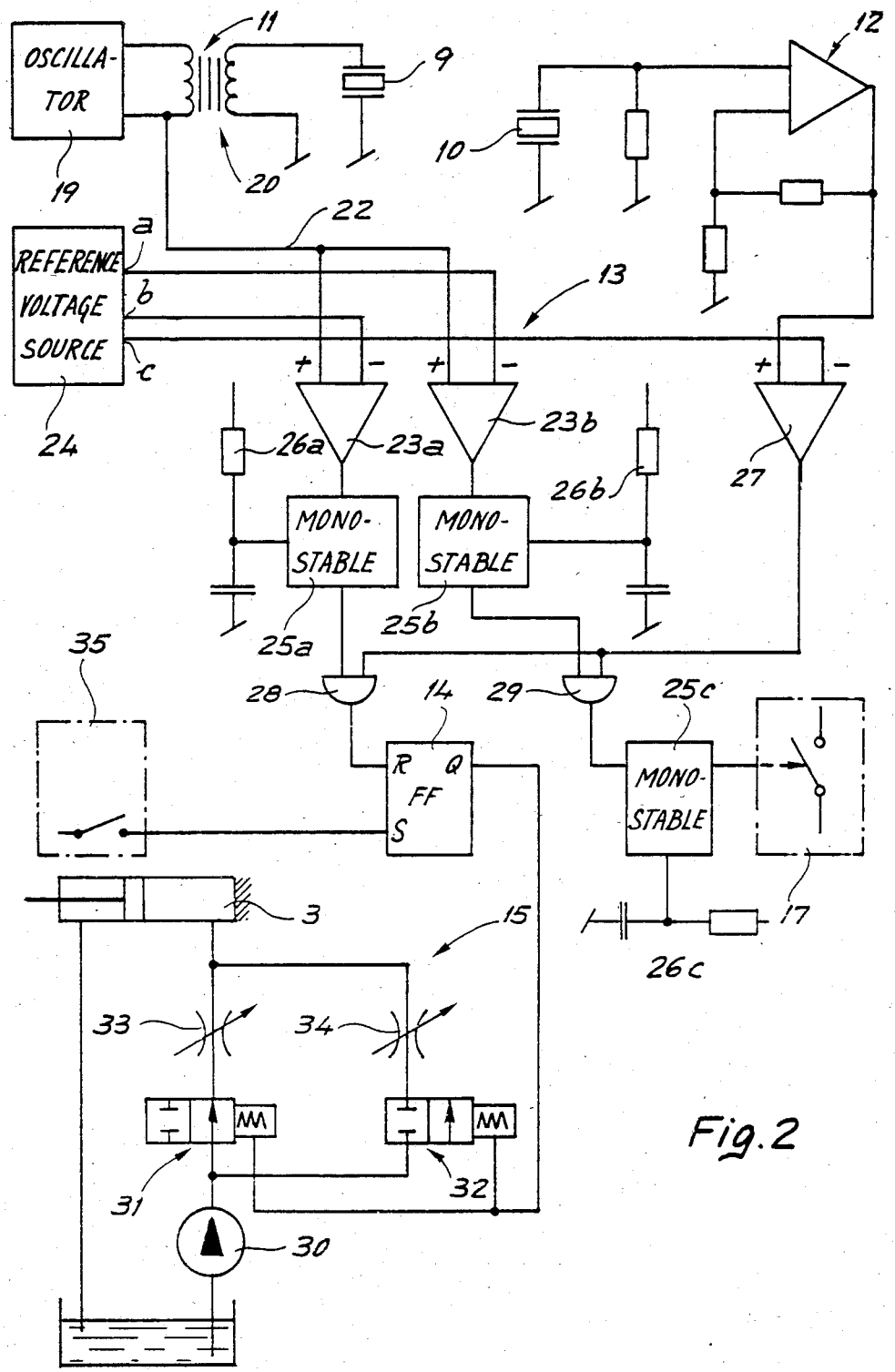
FIG. 2 is a more detailed schematic of an electrohydraulic circuit which may be employed.
Figure 3:
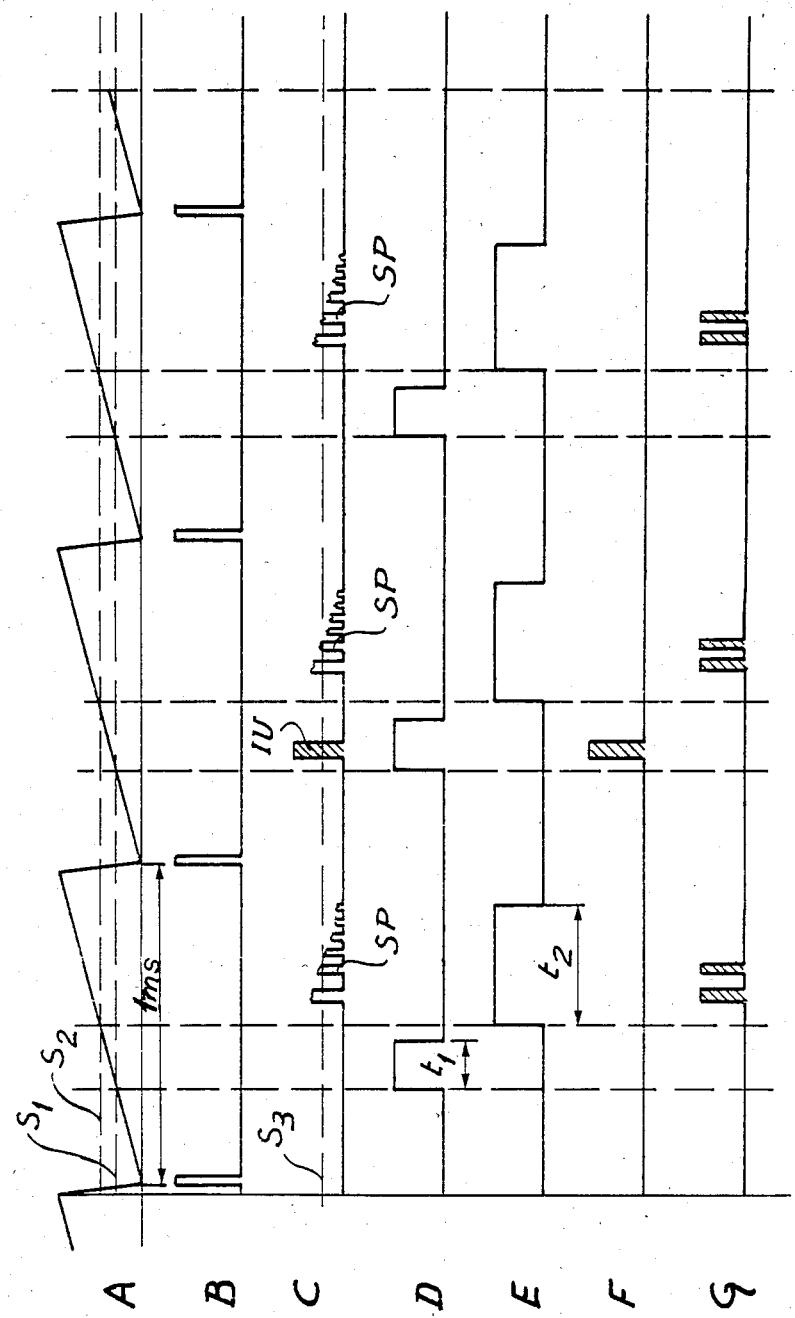
FIG. 3 is a timing diagram showing the appearance of certain signals occurring in the circuit of FIG. 2.

On FIGS. 2 and 3 there has thus been shown a preferred realization of the putting into practice of a certain number of the possibilities which have just been suggested. On FIG. 2, identical references have been used for elements which have already been described in reference to FIG. 1. Some of these elements have been shown in greater detail. The generator 11 includes an oscillator 19 which is intended to generate a saw-tooth signal (curve A of FIG. 3).

The output of this oscillator is applied to the primary winding of a transformer 20 the secondary winding of which feeds the emitting transducer 9. The latter thus receives periodically a pulse (curve B) at the return to zero of the saw-tooth signal. The primary of transformer 20 is coupled to a line 22. The latter is applied to circuit 13 which comprises initially two comparators 23a and 23b, the positive inputs of which are connected to line 22.

The negative inputs of the comparators are connected to a source 24 which provides three reference voltages on terminals a, b and c. Thus, the signal which is present on line 22 is compared with the reference voltages of the outputs a and b of source 24, from which there results at the output of comparators 23a and 23b comparison signals when the saw-tooth signal crosses respectively the thresholds S1 and S2 established by the reference voltages (see curve A of FIG. 3).

The outputs of comparators 23a and 23b are coupled respectively to monostable circuits 25a and 25b which by respective RC circuits 26a and 26b are adjusted to different time constants. Thus, there appears at the output of monostable circuits 25a and 25b two rectangular signals (curves D and E of FIG. 3) each constituting a time slot of a predetermined duration t1 and t2 respectively.

The signal emitted by transducer 9 is shown by curve B on FIG. 2. The pulse which is generated by this transducer gives rise at its reception in transducer 10 to a signal having the form of curve C of FIG. 3. When the tool 5 (FIG. 1) and the workpiece 8 are spread apart from one another, each emission of a pulse by transducer 9 brings about the reception of a parasitic signal SP in transducer 10, the acoustic energy transiting via the framework of the machine. This signal has a relatively reproduceable form from excursion to excursion of the saw-tooth signal and may exhibit a damped form; reflections from various parts of the framework may moreover appear. This situation is shown by way of example in the first, second and third periods of the saw-tooth signal of FIG. 3, it being naturally understood that this figure does not show precise reality on the time plan, but serves basically as an explanation of the operation of the arrangement according to the invention.

It is thus supposed that in the course of the second period a contact is established between tool 5 and workpiece 8, this giving rise to the reception by transducer 10 of an acoustic useful pulse IU capable of being employed to modify the approach speed of tool 5, as has already been explained in respect of FIG. 1.

It is evident that the time relationship between, on the one hand, the emitted pulse (curve B) and, on the other hand, signals SP and IU are well determined and known for each type of machine since the propagation of the acoustic energy via the two possible paths is measurable.

This is why it may be sufficient to create two time slots t1 and t2 in order to detect respectively the useful signal and the parasitic signal. Thus, in the course of the second period as shown on FIG. 3, it will be known that the useful pulse must be produced within the time slot t1 which has purposely been chosen to have a certain safety margin. In the same manner, it is known in advance that the parastic signal must occur during the time slot t2 which has likewise been chosen for safety reasons to be wider than entirely necessary.

On returning to FIG. 2, it is seen that transducer 10 is coupled to amplifier 12 which here is a simple operational amplifier provided with a resistive reactive circuit.

It is well understood as already indicated, that this amplifier may be completed by a certain number of filter means permitting the detection of particular characteristics of the signal when the emitted signal has the same particular characteristics. The signal provided by amplifier 12 is applied to the positive input of a comparator 27, the negative input of which receives the reference voltage from the output c of source 24, this voltage comprising threshold S3 of curve C on FIG. 3.

The comparator 27 thus only permits the passing of the portion of signals SP and IU which exceeds threshold S3 and the signal which results therefrom is submitted to an AND operation in gates 28 and 29, from which there results respectively signals represented by curves F and G of FIG. 3.

The signal coming from AND gate 28 is coupled to circuit 14 which is none other than an RS flip-flop which is set to its initial state by a switch 35 and which provides at its output the signal which controls motor 3.

This latter is here supposed to be a hydraulic power cylinder actuator which is connected to a pump 30 via two valves 31 and 32 and two constrictions 33 and 34. When the control signal at the output of flip-flop 14 is not present, valve 31 allows passage of the hydraulic fluid with large flow towards motor cylinder 3 via the constriction 33 which is calibrated in a manner such that the power piston is displaced at high speed. On the other hand, if the signal is present, valve 31 is closed and valve 32 is open to permit passage of the hydraulic fluid through constriction 34 which assures a reduced flow and consequently, a low speed of the power piston of motor 3.

AND gate 29 is coupled to circuit 25c (a resettable monostable circuit) of which the time constant determined by RC circuit 26c is longer than the period of oscillator 19.

When the pulses at the input trigger are absent during a greater time period, circuit 25c controls switch 17 which may serve for setting off an alarm, for stopping the machine or for any other appropriate control function.

What I claim is:

1. A machine tool apparatus for controlling the advance of a tool (5) during its approach toward a workpiece (8), said machine tool apparatus comprising:
   (a) a framework (1),
   (b) means (3) for moving said tool on said framework with respect to said workpiece between a non-engaged inoperative position and an engaged operative position of said tool with respect to said workpiece,
   (c) acoustic energy generating means (9) for periodically applying acoustic energy to a first element constituted by said tool and said workpiece, said acoustic energy having a predetermined frequency,
   (d) modulating means operatively coupled to said acoustic energy generating means for modulating said energy,
   (e) acoustic energy detecting means (10) for detecting in a second of said elements acoustic energy at said predetermined frequency exceeding a predetermined level,
   (f) demodulating means operatively coupled to said acoustic energy detecting means for demodulating detected acoustic energy, and
   (g) control signal generating means associated with said acoustic energy detecting means and said demodulating means for generating a control signal upon detection and demodulation of said acoustic energy, said control signal generating means being connected to said moving means to reduce speed thereof when said control signal is applied thereto.

2. An apparatus as claimed in claim 1, wherein said modulating means is an amplitude modulating means.

3. An apparatus as claimed in claim 1, wherein said modulating means is a frequency modulating means.

4. An apparatus as claimed in claim 1, wherein said modulating means is a phase modulating means.

5. An apparatus as claimed in claim 1, wherein said modulating means is a pulse code modulating means.

6. A machine tool apparatus for controlling the advance of a tool (5) durings its approach toward a workpiece (8), said machine tool apparatus comprising:
   (a) a framework (1),
   (b) means (3) for moving said tool on said framework with respect to said workpiece between a non-engaged inoperative position and an engaged operative position of said tool with respect to said workpiece,
   (c) acoustic energy generating means (9) for periodically applying pulsed acoustic energy to a first element constituted by said tool and said workpiece,
   (d) acoustic energy detecting means (10) for detecting in a second of said elements acoustic energy exceeding a first predetermined level and for producing a first output signal each time said first level is exceeded by said detected acoustic energy, and
   (e) propagation time discriminating means (13) connected to said acoustic energy generating means and said acoustic energy detecting means, said discriminating means comprising:
      (1) first time slot setting means for generating a first time slot (t1) signal having a first predetermined duration and occurring after application of each pulse of said pulsed acoustic energy, and (2) control means (28, 14) responsive to said output signal and said time slot signal for generating a control signal, said control means being operatively connected to said moving means for reducing approach speed of said tool solely when said first output signal is detected within the time slot as determined by said time slot signal.

7. An apparatus as claimed in claim 6, further comprising:

(a) second time slot setting means for generating a second time slot (t2) signal having a second predetermined duration and occurring after a respective one of said first time slot signals and between two succeeding pulses of said pulsed acoustic energy, and (b) warning signal generating means (29, 25c, 17) associated with said second time slot setting means and responsive to a failure of reception during said second time slot of acoustic pulsed energy by said acoustic energy reception means.

* * * * *